UNITED STATES PATENT OFFICE.

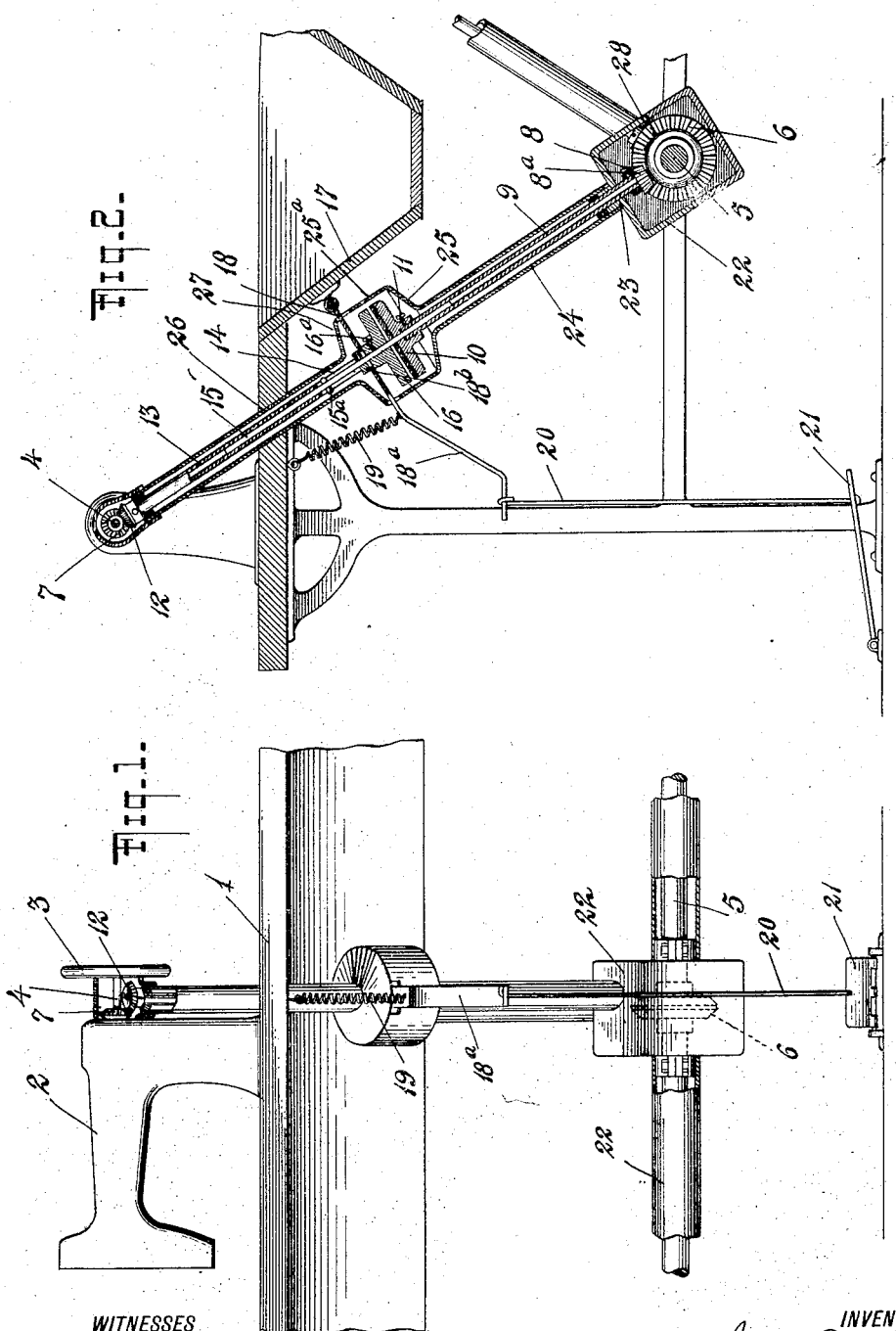

JACOB FISCHER, OF ROSEVILLE, NEW JERSEY, ASSIGNOR OF ONE-HALF TO DANIEL BRANDENSTEIN, OF NEW YORK, N. Y.

SEWING-MACHINE POWER-TRANSMITTER.

1,156,354.  Specification of Letters Patent.  Patented Oct. 12, 1915.

Application filed November 11, 1914.  Serial No. 871,469.

*To all whom it may concern:*

Be it known that I, JACOB FISCHER, a citizen of the United States, and a resident of Roseville, in the State of New Jersey, have invented certain new and useful Improvements in Sewing-Machine Power-Transmitters, of which the following is a specification.

The object of the present invention is the construction of a power driven sewing machine wherein practically all the moving parts are inclosed, use of belting is obviated and ample protection is thereby given to the operator against accident from contact with the moving parts or from the breaking of belting. My invention, moreover, enables the moving parts to be driven at variable speeds, the variations of speed being attained by the employment of a pair of clutch members in conjunction with a foot treadle.

Figure 1 of the accompanying drawing shows an elevation partly in section of my improved mechanism; Fig. 2 shows a longitudinal cross-section of the driving mechanism, in conjunction with its related parts.

In these drawings, 1 represents a power machine table of ordinary construction; 2 a sewing machine head supported upon said table; 3 the hand wheel common to such heads, which is made fast upon the end of the driving shaft 4 of such sewing machine head; 5 represents the primary power shaft supported in bearings below the table 1, said shaft being provided with a gear wheel 6, rigidly secured thereon so as to rotate therewith.

7 represents a beveled gear secured upon the head driving shaft 4

Interposed to establish communication between the beveled gear on the primary power shaft 5, a beveled gear 8, in continuous mesh with said gear 6 is secured upon a hollow shaft 9 extending toward said machine head 2, and in line with a hollow shaft 13. Said beveled gear 8 is rigidly secured upon the hollow shaft 9 by a set screw 8ª and said shaft 9 carries upon its upper end a clutch member 10 rigidly secured thereto by a set screw 11. In mesh with the machine head beveled gear 7 a beveled gear 12 is similarly secured upon the hollow shaft 13 which extends in a direction downwardly in line with the hollow shaft 9 and which is formed at its lower end with a forked portion 14 for the purpose of engaging with lugs 15ª secured upon a rod 15 which extends from the hollow shaft 9 upwardly and into the hollow shaft 13. The forked portion of shaft 13 permits of a relative up and down movement of the rod 15. This rod 15, which, as stated, extends partly through both hollow shafts 9 and 13 carries a clutch member 16, rigidly secured thereto by an appropriate set screw 16ª said clutch member 16 being adapted to be brought into engagement with the clutch member 10 on shaft 9 before described.

It will be noted from the foregoing description that the forked portion 14 of the hollow shaft 13 being in engagement with the lugs 15ª of the rod 15 said hollow shaft 13 will rotate with the said rod 15 when the hollow shaft 9 is rotated from main power shaft 5 and the clutch members 16 and 10 are brought into engagement with one another. Conversely, the said hollow shaft 13 will remain inert whenever the clutch members 16 and 10 are out of engagement with one another.

For the purpose of depressing the clutch member 16 and bringing it into engagement with the clutch member 10, I secure upon the trough 17, or any other convenient place of the sewing machine table 1, a pivotally mounted link 18, which extends to and surrounds the rod 15 and thence continues toward the front of the machine as shown at 18ª. Connected to this link 18 a downwardly depending link 20 is provided, at the end of which a foot treadle 21 is connected. The link 18—18ª is maintained in its inoperative position by means of a spring 19 which may be secured to the table 1, and which tends to hold said link as well as the link 20 and the treadle 21 in an upward position. The link 18—18ª at the point where it surrounds the rod 15 comes, moreover, into contact with a collar, rigidly secured upon said rod 15 so that the tensile power of the spring 19 also serves to maintain the clutch member 16 out of contact with its coöperating clutch member 10.

From the foregoing description it will be noted that the rotation of the hollow shaft 9 may be imparted to the hollow shaft 13 by depressing the treadle 21, and through it the link 20 and the link 18—18ª, whereby the link 18—18ª will press downwardly upon the clutch member 16 bringing it into contact with clutch member 10. When pressure upon the treadle 21 is relieved it will be understood that all of these parts will attain their inoperative position. It will also be understood that a variation in the pressure upon the treadle and therethrough upon the coöperating clutch members will result in a variation in speed, this being due to the variation of the frictional engagement of the clutch members 10 and 16.

The construction of my invention enables me to inclose all the moving parts beneath the sewing machine table in a protective tubing or casing so that there will be no liability of injury to the operator, due to contact with such moving parts. Thus, the main driving shaft 5 is permanently inclosed in a metal casing 22 which has the opening 23 for the passage of the hollow shaft 9. Immediately from this opening 23 the tubing 24 extends upwardly, having an offset portion 25 for the accommodation and protection of the clutch members 10 and 16. The hollow shaft 13 is similarly inclosed by the tubing 26 extending downwardly approximately as far as the link 18 with the offset portion 27 which meets the offset portions 25 and 25ª on either side. For the accommodation of the link 18—18ª and its up and down movement, it is necessary merely to provide oppositely located slots on the two sides of this box-like structure inclosing the clutch members but otherwise the entire mechanism, from the main driving shaft up to the sewing-machine-head, is completely inclosed. This metal casing 22 in my construction is advantageously utilized as a grease box to lubricate the parts.

In Fig. 2 of my drawings I have shown a gear 28 similar to the gear 8 but extending in a direction opposite to that of the gear 8 and of its connected parts. This gear 28 and its connected parts, all being substantially similar to those of gear 8, will be made to engage beveled gear teeth on the opposite side of the gear wheel 6 and will permit of the utilization of but a single beveled gear wheel simultaneously to actuate the mechanism of two oppositely located sewing machines.

What I claim and desire to secure by Letters Patent is:

1. A power transmitter for sewing machines comprising a driving gear, supported beneath the sewing machine table; a driven gear secured upon the driving shaft of the sewing machine head; a transmitter shaft consisting of a lower shaft section and an upper shaft section in alinement with one another and extending from the driving gear upwardly to the driven gear upon the sewing machine head; a beveled gear upon the lower end of said lower shaft section, in engagement with said driving gear; a beveled gear upon the upper end of said upper shaft section, in engagement with the driven gear upon the sewing machine head; a clutch member upon each end of said shaft sections opposite the end carrying the respective beveled gears; spring actuated means for maintaining said clutch members apart and a treadle for bringing said clutch members into engagement with one another against the tension of said spring actuated means.

2. A power transmitter for sewing machines comprising a driving gear, supported beneath the sewing machine table; a driven gear secured upon the driving shaft of the sewing machine head; a transmitter shaft consisting of a lower shaft section and an upper shaft section in alinement with one another and extending from the driving gear upwardly to the driven gear upon the sewing machine head; a beveled gear upon the lower end of said lower shaft section, in engagement with said driving gear; a beveled gear upon the upper end of said upper shaft section, in engagement with the driven gear upon the sewing machine head; a clutch member upon each end of said shaft sections opposite the end carrying the respective beveled gears; means for maintaining said clutch members apart and a treadle for bringing said clutch members into engagement with one another.

3. A power transmitter for sewing machines comprising a driving gear, supported beneath the sewing machine table; a driven gear secured upon the driving shaft of the sewing machine head; a transmitter shaft consisting of a lower shaft section and an upper shaft section in alinement with one another and extending from the driving gear upwardly to the driven gear upon the sewing machine head; a beveled gear upon the lower end of said lower shaft section, in engagement with said driving gear; a beveled gear upon the upper end of said upper shaft section, in engagement with the driven gear upon the sewing machine head; a clutch member upon each end of said shaft sections opposite the end carrying the respective beveled gears; spring actuated means for maintaining said clutch members apart and means for bringing said clutch members into engagement with one another.

In testimony whereof I have hereunto set my hand in the presence of two subscribing witnesses.

JACOB FISCHER.

Witnesses:
CHARLES WISCHNITZER,
DANIEL BRANDENSTEIN.